United States Patent Office 3,015,629
Patented Jan. 2, 1962

3,015,629
ANTIFREEZE COMPOSITION
James K. Truitt, Beacon, N.Y., assignor to Texaco Inc., a corporation of Delaware
No Drawing. Filed Mar. 24, 1958, Ser. No. 723,085
14 Claims. (Cl. 252—75)

This invention relates to novel corrosion inhibited single phase permanent antifreeze compositions and to aqueous solutions thereof. The invention also concerns a method of producing the novel antifreezes and their aqueous solutions. In addition, the invention covers a method of preventing corrosion of metals which come in contact with such compositions.

In antifreeze mixtures the freezing point depressant is essentially one of two types, namely, non-permanent and permanent. The non-permanent freezing point depressant is a water-miscible, low boiling monohydroxy alcohol such as methyl alcohol, ethyl alcohol, propyl alcohol, and mixtures thereof. The permanent type antifreezes to which this invention is directed contain as a freezing point depressant a water-soluble, high boiling polyhydroxy alcohol such as ethylene glycol, propylene glycols, butylene glycols, and mixtures thereof.

It is well known that both uninhibited permanent and non-permanent type antifreezes and aqueous solutions thereof cause serious corrosion of metals during service. These antifreeze mixtures promote corrosion of brass, copper, solder, steel, iron and aluminum in heat exchange apparatus such as the cooling systems of internal combustion engines.

A large number of corrosion inhibitors and combinations thereof have been employed in the prior art to inhibit the corrosive action of non-permanent and permanent type antifreezes. The antifreezes having the inhibitors dissolved only in the freezing point depressant and without any oil layer are known as single-phase antifreezes; and those which have inhibitors dissolved in a separate oil layer are known as the two phase antifreezes. Although many of the prior art inhibited antifreezes are generally satisfactory, they are often deficient in one or more aspects. For example, they may, when used as a coolant in automobile cooling systems deteriorate the rubber radiator hose, creep, foam and/or fail to provide adequate corrosion protection for one or more metals forming such cooling systems. Furthermore, those of the two phase type cannot be shipped in bulk because of the difficulty of recovering the product with the proper proportion of oil and glycol.

An object of this invention is to provide new antifreeze compositions and aqueous solutions thereof which afford superior corrosion protection to metals normally found in heat exchange apparatus. Another object is to provide an antifreeze which is non-foaming, resistant to creep and does not deteriorate rubber. Still another object is to provide an antifreeze which is of low cost and of simple preparation, and which may be shipped in large volume bulk containers such as drums or tank cars.

In accordance with this invention and the objects thereof, I have discovered permanent type single phase antifreeze compositions and aqueous solutions thereof comprising a water soluble liquid glycol, magnesium tetraborate and an alkali metal mercaptobenzothiazole which provide superior corrosion protection to metals normally found in heat exchange systems, and which also are foam resistant, creep resistant, compatible with rubber hosing, low cost and of simple preparation.

I have further found magnesium tetraborate and alkali metal mercaptobenzothiazoles in combination act synergistically in the novel antifreeze compositions to retard the corrosion of solder, steel and cast iron.

The glycols which may be employed in the present invention as the freezing point depressant component are any of the water-soluble liquid glycols such as ethylene glycol, propylene glycols, butylene glycols, diethylene glycols, and the like. The freezing point depressant should generally constitute between about 10 and 100 volume (vol.) percent of the novel antifreeze compositions. A preferred glycol is ethylene glycol, which as sold commercially often contains a small amount up to 10% by weight of diethylene glycol. The term ethylene glycol as used herein is intended to read either on the pure or commercial compound.

I include within the definition of magnesium tetraborate, the hydrous as well as the anhydrous forms thereof. The quantity of magnesium tetraborate employed in the novel antifreezes should generally be about .01 and 5% by weight (wt.) based on the glycol. Preferably magnesium tetraborate concentrations are between about 0.5 and 3 wt. percent.

Several specific examples of the alkali metal mercaptobenzothiazoles contemplated herein are sodium mercaptobenzothiazole and potassium mercaptobenzothiazole. The quantity of alkali metal mercaptobenzothiazole employed should generally be between about 0.0001 and 1%, preferably between about .01 and 0.5% by weight based on the glycol. The preferred alkali metal mercaptobenzothiazole is sodium mercaptobenzothiazole.

Among the metals to be protected by the disclosed novel antifreeze compositions are brass, copper, solder, steel, iron and aluminum.

Water may be combined with the antifreezes of this invention in any and all proportions to form the aqueous antifreeze solutions thereof. When aqueous solutions of the novel antifreezes are to be used as coolants in automotive cooling systems, the water-miscible liquid glycol should generally constitute at least about 10 vol. percent, preferably between about 20 and 90 vol. percent, of the aqueous antifreeze solution.

It is to be noted the freezing point of the aqueous glycol coolants is substantially determined by the quantity of glycol therein. For example, a minimum freezing point of approximately −60° F. is obtained with about 60% ethylene glycol by volume. Further increase or decrease in the ethylene glycol concentration raises the freezing point.

In the preparation of our novel antifreeze compositions and the aqueous solutions thereof, the magnesium tetraborate is conveniently formed in situ by adding boric acid and magnesium oxide (MgO) in a mol ratio of between about 3.5:1 and 4.5:1, preferably 4:1, to a water soluble liquid glycol with stirring, and heating the mixture to between about 150 to 250° F. with continued stirring until all evidence of milkiness has disappeared. A small amount of water is also formed in this reaction, but it is not an essential ingredient of the antifreeze concentrate as far as corrosion inhibition and coolant properties are concerned. The resultant solution is then cooled, preferably to below about 120° F., and the alkali metal mercaptobenzothiazole is added as a solid or an aqueous solution with stirring and the stirring is continued until visual observation reveals a homogeneous product. It is preferable to add the alkali metal mercaptobenzothiazole as aqueous solution, e.g. a 40 to 60% by weight solution in water, in order to promote faster solution in the antifreeze. Also, it is desirable to filter the aqueous alkali metal mercaptobenzothiazole before adding to the antifreeze in order to insure the removal of any precipitated oxidation products such as dibenzothiazole disulfide. Dibenzothiazole disulfide although not adversely affecting the chemical and physical properties of the novel antifreezes does cause a haze therein which may promote consumer resistance to the product.

If desired, the above homogeneous antifreeze products may be diluted by mixing with water in any and all proportions to form aqueous solutions thereof.

The following examples serve to illustrate my invention in greater detail:

EXAMPLE I

This example illustrates the method of preparation of the novel antifreeze compositions.

To 96.48 pounds (lbs.) of commercial grade ethylene glycol, which was continuously stirred during the entire time of the antifreeze preparation, there was added 1.72 lbs. of boric acid and the resultant mixture was heated. When a temperature of 200° F. was reached, 0.28 lb. of magnesium oxide was added to the stirred mixture and the mixture temperature was held at 200° F. until all trace of milkiness therein had disappeared. The resulting solution was then cooled to 100° F. and 0.78 lb. of a filtered 50% by weight solution of sodium mercaptobenzothiazole in water, and 0.74 lb. of water were added. Stirring was continued until a clear homogeneous product was formed. The preceding quantities produced 10.6 gallons of final product.

The final product was of the following composition:

| Ingredients: | Weight percent |
|---|---|
| Ethylene glycol | 96.48 |
| Magnesium tetraborate | 1.26 |
| Sodium mercaptobenzothiazole | .39 |
| Water | 1.87 |

It is to be noted that the use of water in the above procedure is not an essential for the formulation of the novel antifreeze.

EXAMPLE II

This example illustrates the corrosion inhibition effectiveness of the antifreeze compositions of this invention.

The corrosion test employed and which is described directly below simulates conditions under which corrosion of oxidizable metals is frequently encountered in automotive engine cooling systems containing antifreeze compositions.

A clean, open-top, Pyrex glass cell is fitted with two air inlet tubes respectively connected to the bottom and middle of the cell, both joining outside the cell to form a single inlet tube, and an air outlet tube connected to the upper side of the cell. One hundred and fifty (150) milliliters of a 25% by volume antifreeze solution in water is charged to the cell. The water used to dilute the antifreeze to 25% by volume contains a 200 p.p.m. (by weight) chloride ion concentration. The air outlet tube is connected to a water cooled condenser and the joined inlet tubes are connected to a compressed air source. The open top of the cell is closed with a new rolled cork through which is passed a glass rod ending in a hook from which a bundle of test metal strips is suspended by a Nichrome wire. The test bundle comprises clean and weighed test metal strips of copper, brass, solder, cast iron, steel, and cast aluminum having a known surface area removably mounted on a brass bolt and spaced with stainless steel washers. The bolt is tightened with a brass nut to hold the test metal strips rigid. This arrangement galvanically couples the individual metal strips to one another. The surface area of these test metals are in approximately the same relative proportion to one another as they would be in a representative automotive cooling system. The ratio of test metal surface area to coolant is also approximately the same as in an automotive cooling system.

The glass rod is adjusted so that the test bundle is immersed in the test solution. The glass cell is then placed in an oil bath maintained at a temperature of 175° F. and air is bubbled into the test solution through the air inlet tubes at a rate of 50 milliliters (mls.) per minute. The air was previously scrubbed free of any carbon dioxide by passing it through a solution of 20 wt. percent sodium hydroxide in water. The cell is maintained in the oil bath for a period of 161 hours (hrs.) whereupon the test bundle is removed. Each test metal strip is freed of corrosion products by scrubbing with a household abrasive cleaner and a soft cloth and then successively rinsed in distilled water and acetone. Each test metal strip is then dried and reweighed with the weight loss being calculated on the basis of milligrams lost per square decimeter of original surface area of the test strip (mg./sq. dm.).

Two antifreezes subjected to the above test were designated as antifreeze A and antifreeze B. Antifreeze A is an uninhibited ethylene glycol and antifreeze B is a representative of the novel antifreeze compositions of this invention.

The test data and results are reported below in Table I. In addition the pH and reserve alkalinity of the 25% by vol. antifreeze solutions determined at the beginning (initial) and at the end (final) of the test are also recited below. Reserve alkalinity is the number of cubic centimeters (cc.) of a 0.1 normal acid required to bring 50 cc. of the test solution to a pH of 5.5.

Table I

| Description | Antifreeze A | Antifreeze B |
|---|---|---|
| Composition of test solution, vol. percent: | | |
| Water component (200 p.p.m. Cl⁻) | 75 | 75 |
| Antifreeze component | 25 | 25 |
| Composition of antifreeze component, weight percent: | | |
| Ethylene glycol | 96.48 | 96.48 |
| Magnesium tetraborate | | 1.26 |
| Sodium mercaptobenzothiazole | | 0.13 |
| Water | 3.52 | 2.13 |
| pH: | | |
| Initial | 6.5 | 7.9 |
| Final | 4.6 | 7.6 |
| Reserve alkalinity to pH of 5.5: | | |
| Initial | 0.5 | 23.1 |
| Final | | 14.3 |
| Corrosion loss of test strips,[1] mg./sq. dm.: | | |
| Brass | 3 | 17 |
| Copper | 7 | 12 |
| Solder | 56 | 42 |
| Steel | 2,095 | 24 |
| Cast iron | 2,210 | 14 |
| Cast aluminum | 20 | 78 |

[1] Corrosion loss for each metal based on the average weight loss/sq. dm. of 4 tests.

As can be seen from the above table, my novel inhibited antifreeze B substantially reduces the corrosion of steel, cast iron and solder. Although my novel antifreeze representative gave somewhat higher corrosion losses to brass, copper and aluminum than did the comparative antifreeze A, these losses still remained low.

EXAMPLE III

This example illustrates the synergistic corrosion inhibitor action for solder, steel and cast iron of the magnesium tetraborate and the alkali metal mercaptobenzothiazole combination in the novel antifreeze compositions of this invention.

Four test antifreeze formulations were subjected to the corrosion test described in Example II. They are respectively designated as antifreeze C, antifreeze D, antifreeze E and antifreeze F.

Antifreeze F is a representative of the novel antifreezes of this invention and antifreezes C, D and E are comparative antifreeze compositions.

The test data and results are reported below in Table II. The initial and final pH and reserve alkalinity of the test solutions are also listed.

Table II

| Description | Antifreeze C | Antifreeze D | Antifreeze E | Antifreeze F |
|---|---|---|---|---|
| Composition of the test solution, vol. percent: | | | | |
| Water component (200 p.p.m. Cl⁻) | 75 | 75 | 75 | 75 |
| Antifreeze component | 25 | 25 | 25 | 25 |
| Composition of antifreeze component, weight percent: | | | | |
| Ethylene glycol | 96.48 | 96.48 | 96.48 | 96.48 |
| Magnesium tetraborate | | 1.26 | | 1.26 |
| Sodium mercaptobenzothiazole | | | 0.13 | 0.13 |
| Water | 3.52 | 2.26 | 3.39 | 2.13 |
| pH: | | | | |
| Initial | 6.5 | 7.9 | 8.4 | 7.9 |
| Final | 4.6 | 7.1 | 4.6 | 7.6 |
| Reserve alkalinity to pH of 5.5: | | | | |
| Initial | 0.5 | 20.7 | 0.8 | 23.1 |
| Final | | 4.5 | | 14.3 |
| Corrosion loss of test strip,[1] mg./sq. dm.: | | | | |
| Solder | 56 | 109 | 119 | 42 |
| Steel | 2,095 | 34 | 1,462 | 24 |
| Cast iron | 2,210 | 139 | 905 | 14 |

[1] Corrosion loss for each metal based on average weight loss/sq. dm. of 4 tests.

Inspection of the above table shows the magnesium tetraborate-alkali metal mercaptobenzothiazole combination in the novel antifreeze representative acts synergistically to reduce corrosion of solder, steel and cast iron. This synergistic action is particularly clear in the case of solder. When only one member of the inhibitor combination is employed, the corrosion loss of solder is higher than with an uninhibited ethylene glycol antifreeze, yet when both are employed, the corrosion loss of solder is substantially lower.

EXAMPLE IV

This example illustrates the superiority corrosion-wise of the novel antifreeze compositions over an antifreeze taught in the prior art.

Two antifreeze formulations were subjected to the corrosion test described in Example II and were respectively designated as antifreeze G and antifreeze H. Antifreeze G is a representative of the prior art antifreeze and antifreeze H is a representative of the antifreeze compositions of this invention.

The test data and results are reported below in Table III. Also the pH and reserve alkalinity of the initial and final test solutions are mentioned.

Table III

| Description | Antifreeze G | Antifreeze H |
|---|---|---|
| Composition of the test solution, vol. percent: | | |
| Water component (200 p.p.m. Cl⁻) | 75 | 75 |
| Antifreeze component | 25 | 25 |
| Composition of antifreeze component, weight percent: | | |
| Ethylene glycol | 96.48 | 96.48 |
| Magnesium tetraborate | | 1.26 |
| Sodium tetraborate | 1.26 | |
| Sodium mercaptobenzothiazole | 0.13 | 0.13 |
| Water | 2.13 | 2.13 |
| pH: | | |
| Initial | 7.9 | 7.9 |
| Final | 8.0 | 7.6 |
| Reserve alkalinity to pH of 5.5: | | |
| Initial | 28.7 | 23.1 |
| Final | 27.4 | 14.3 |
| Corrosion loss of test strips,[1] mg./sq. dm.: | | |
| Brass | 18 | 17 |
| Copper | 11 | 12 |
| Solder | 78 | 42 |
| Steel | 101 | 24 |
| Cast iron | 27 | 14 |
| Cast aluminum | 185 | 78 |

[1] Corrosion loss for each metal based on average weight loss/sq. dm. of 4 tests.

As can be seen in the above table, my novel antifreeze compositions represented by antifreeze H provide superior corrosion protection to all the tested metals with the possible exception of copper.

EXAMPLE IV

This example illustrates the desirable foam resistant properties of the novel antifreeze compositions and their superiority with respect to foam resistance over a prior art antifreeze as well as their superiority over an uninhibited glycol formulation.

The foam test procedure employed consists of placing 250 cc. of a 40% by volume antifreeze in distilled water in a clean 800 ml. beaker and stirring the beaker contents with an electric mixer of the household variety operated at a speed of 1000 r.p.m. for a 100 second period while maintaining the test solution temperature at 160° F. At the instant the mixer is cut off, the foam height and the foam callapse time are measured. The foam collapse time is the interval between the cutting off of the mixer and the appearance of the first stable opening in the foam layer.

In addition to the above test, a modified foam test was employed. It is identical to the above procedure except a foam producing agent was added to the aqueous test solutions to form solutions having a foam producing agent content of 5 and 10% by volume. The composition of the foam producing agent employed, designated as agent X, is as follows:

Ingredients: Weight percent
Sodium sulfonate oil mixture _____ 16.0
Gum rosin _____ 4.2
Naphthenic acid _____ 7.1
Sodium hydroxide (49 wt. percent in water) __ 2.0
Ethylene glycol monobutyl ether _____ 1.0
Water _____ 0.9
Lubricating oil (Saybolt Universal viscosity of 70 seconds at 100° F.) _____ 68.8

Three antifreeze compositions were subjected to the previously described foaming and modified foaming tests. These antifreeze formulations are designated as antifreeze I, antifreeze J and antifreeze K. Antifreeze I is an uninhibited ethylene glycol. Antifreeze J is a prior art antifreeze and antifreeze K is a representative of the novel composition of this invention.

The data and results of the foaming and modified foaming tests are reported below:

Table IV

| Description | Antifreeze I | Antifreeze J | Antifreeze K |
|---|---|---|---|
| Composition of test solution, vol. percent: | | | |
| Water component (distilled) | 60 | 60 | 60 |
| Antifreeze component | 40 | 40 | 40 |
| Composition of antifreeze component, weight percent: | | | |
| Ethylene glycol | 96.48 | 96.48 | 96.48 |
| Magnesium tetraborate | | | 1.26 |
| Sodium tetraborate | | 1.26 | |
| Sodium mercaptobenzothiazole | | 0.13 | 0.13 |
| Water | 3.52 | 2.13 | 2.13 |
| Foam height, inches: | | | |
| Test solution | 0 | ⅙ | 0 |
| Test solution +5 vol. percent agent X | 4⅜ | 3½ | 0 |
| Test solution +10 vol. percent agent X | 4⅜ | 3 | 0 |
| Foam collapse time, seconds: | | | |
| Test solution | 0 | 2 | 0 |
| Test solution +5 vol. percent agent X | >600 | 142 | 0 |
| Test solution +10 vol. percent agent X | >600 | 82 | 0 |

From an inspection of the results reported in the above Table IV, it is seen that my novel antifreeze composition represented by antifreeze K does not foam and prevents foaming even in the presence of a foam producing agent. The prior art antifreeze represented by antifreeze J undesirably foams with or without a foam producing agent. The uninhibited glycol represented by antifreeze I does not have reserve foam resisting properties.

In an extensive field test conducted on my novel antifreeze compositions in automotive engines no deterioration of rubber radiator hosing was found nor was any excessive creeping by the antifreezes observed.

Obviously, many modifications and variations of the

I claim:

1. An antifreeze composition adapted to be added to water consisting essentially of a water-soluble liquid glycol, between about .01 and 5% by weight of magnesium tetraborate and between about .0001 to 1% by weight of an alkali metal mercaptobenzothiazole.

2. An antifreeze composition adapted to be added to water consisting essentially of a water-soluble liquid glycol, between about 0.5 and 3% by weight of magnesium tetraborate and between about .01 and 0.5% by weight of an alkali metal mercaptobenzothiazole.

3. An antifreeze composition in accordance with claim 2, wherein said glycol is ethylene glycol and said alkali metal mercaptobenzothiazole is sodium mercaptobenzothiazole.

4. An antifreeze composition consisting essentially of between about 10 and 100% by volume of a water-soluble liquid glycol solution containing between about .01 and 5% by weight of magnesium tetraborate, and between about .0001 and 1% by weight of an alkali metal mercaptobenzothiazole, the remainder of said composition being water.

5. An antifreeze composition consisting essentially of between about 10 and 100% by volume of a water-soluble liquid glycol solution containing between about 0.5 and 3% by weight of magnesium tetraborate, and between about .01 and 0.5% by weight of an alkali metal mercaptobenzothiazole, the remainder of said composition being water.

6. An antifreeze composition in accordance with claim 5 wherein said glycol is ethylene glycol and said alkali metal mercaptobenzothiazole is sodium mercaptobenzothiazole.

7. A method of producing an antifreeze composition comprising mixing boric acid and magnesium oxide in a mol ratio of between about 3.5:1 and 4.5:1 in a water-soluble liquid glycol at between about 150 and 250° F. until the resultant solution is substantially clear, subsequently reducing said solution temperature to below about 120° F., and then mixing said resultant solution with an alkali metal mercaptobenzothiazole, the proportions of said glycol, said boric acid, said magnesium oxide and said alkali metal mercaptobenzothiazole being adjusted in a manner to form said composition containing between about .01 and 5% by weight of magnesium tetraborate and between about .0001 and 1% by weight of said alkali metal mercaptobenzothiazole.

8. A method in accordance with claim 7 wherein the proportions of said glycol, said boric acid, said magnesium oxide and said alkali metal mercaptobenzothiazole are adjusted to form said composition containing between about 0.5 to 3% by weight of magnesium tetraborate and between about .01 and 0.5% by weight of said alkali metal mercaptobenzothiazole.

9. A method in accordance with claim 7 wherein said glycol is ethylene glycol and said alkali metal mercaptobenzothiazole is sodium mercaptobenzothiazole.

10. A method in accordance with claim 7 wherein said alkali metal mercaptobenzothiazole is added as a filtered aqueous solution.

11. A method of producing an aqueous antifreeze composition comprising mixing boric acid and magnesium oxide in a mol ratio of between about 3.5:1 and 4.5:1 in a water-soluble liquid glycol at between about 150 and 250° F., until the resultant solution substantially clears, subsequently reducing said solution temperature below about 120° F. and then mixing with said resultant solution an alkali metal mercaptobenzothiazole and water, the proportions of said glycol, said boric acid, said magnesium oxide and said alkali metal mercaptobenzothiazole being adjusted in a manner to form said composition containing between about 10 and 100% by volume of said glycol, between about .01 and 5% by weight of magnesium tetraborate and between about .0001 and 1% by weight of said alkali metal mercaptobenzothiazole, said percent by weight of said magnesium tetraborate and said alkali metal mercaptobenzothiazole being based on said glycol.

12. A method in accordance with claim 11 wherein the proportions of said glycol, said boric acid, said magnesium oxide and said alkali metal mercaptobenzothiazole are adjusted to form said composition containing between about 10 and 100% by volume of said glycol, between about 0.5 and 3% by weight of magnesium tetraborate and between about .01 and 0.5% by weight of said alkali metal mercaptobenzothiazole, said percent by weight of said magnesium tetraborate and said alkali metal mercaptobenzothiazole being based on said glycol.

13. A method in accordance with claim 11 wherein said glycol is ethylene glycol, and said alkali metal mercaptobenzothiazole is sodium mercaptobenzothiazole.

14. A process of inhibiting corrosion of metals which come in contact with antifreeze solutions comprising contacting the metal with a composition consisting essentially of between about 10 and 100% by volume of a water-soluble liquid glycol solution containing between about .01 and 5% by weight of magnesium tetraborate, and between about .0001 and 1% by weight of an alkali metal mercaptobenzothiazole, the remainder of said composition being water.

References Cited in the file of this patent

UNITED STATES PATENTS

| | | |
|---|---|---|
| 2,373,570 | Keller | Apr. 10, 1945 |
| 2,534,030 | Keller | Dec. 12, 1950 |
| 2,765,278 | Holter | Oct. 2, 1956 |
| 2,815,328 | Green | Dec. 3, 1957 |